United States Patent
Doelling et al.

(12)

(10) Patent No.: US 6,213,678 B1
(45) Date of Patent: Apr. 10, 2001

(54) HANGER APPARATUS

(76) Inventors: Mark D. Doelling, 800 Starlight Dr., Atlanta, GA (US) 30342; Michael C. Sacher, 2955 Ascot La., Roswell, GA (US) 30076

( * ) Notice: Subject to any disclaimer, the term of this patent is extended or adjusted under 35 U.S.C. 154(b) by 0 days.

(21) Appl. No.: 09/311,959

(22) Filed: May 14, 1999

Related U.S. Application Data

(63) Continuation-in-part of application No. 09/144,291, filed on Aug. 31, 1998.
(51) Int. Cl.[7] .................................................. B25G 3/18
(52) U.S. Cl. ......................... 403/353; 403/309; 403/213; 403/313
(58) Field of Search .................................. 403/353, 300, 403/305, 309, 310, 311, 313, 213; 24/129 R, 130, 129 A, 702, 684; 248/318, 339, 341, 243

(56) References Cited

U.S. PATENT DOCUMENTS

| | | | |
|---|---|---|---|
| 2,630,303 | 3/1953 | Krucker | 259/108 |
| 3,510,010 | 5/1970 | Gasner | 211/176 |
| 3,936,914 | 2/1976 | Mancini | 24/201 BN |
| 4,515,494 | 5/1985 | Robilliard et al. | 403/187 |
| 4,648,161 | 3/1987 | Rosen | 24/589 |
| 5,246,303 * | 9/1993 | Trilla et al. | 403/353 |
| 5,836,061 | 11/1998 | Castillo et al. | 24/702 |

OTHER PUBLICATIONS

Hook–Up™ Hanger, Metz Farms, 1650 Broadway NW, Grand Rapids, MI 45904.
Hook–It–All™ Hanger, Perky–Pets Products, Inc., 2201 South Wabash Street, Denver, Co 80231.
The Easy Lift Hanger, Easy Lift Hanger Co., P.O. Box 755, Fairfield, OH 45018.
The Hookery, Handmade Wrought Iron Products, JCTS Buyer's Guide, p. 79.
Steel Craft Products, P.O. Box 4434, Rock Hill, SC 29732, 1999 Birding Products Buyers Guide, p. 54.
One of Life's Little Pleasures, Bird Watcher's Digest, Jan./Feb. '99; Survival Project, P.O. Box 99, Minden, NV 89423, p. 9.
The Ultimate Squirrel Guard, 1999 Birding Products Buyer's Guide, p. 51; ERVA, 3100 West Grand Ave., Chicago, IL 60622–4324.
Out on a Limb™, 1999 Birding Products Buyer's Guide, p. 35; Out on a Limb™ Outdoor Products, P.O. Box 250, Wauconda, IL 60084.
HandyPost™, Form:HPS/HPD 11–92 10M, Universal Industrial Products Company, One Coreway Drive, P.O. Box 628, Pioneer, OH 43554–0628, 1992.

(List continued on next page.)

*Primary Examiner*—Lynne H. Browne
*Assistant Examiner*—John R. Cottingham
(74) *Attorney, Agent, or Firm*—Baker, Donelson, Bearman & Caldwell

(57) ABSTRACT

A hanger apparatus assembled by joining connectors to elongate rods, which connectors define an open side running the entire length of the channel with a rib opposite of the opening for strength and rigidity of the connector. Four openings define oblique angle edges, preferably with a 45 degree angle, for clearance open to four slots that are in line with another forming two opposing groups which allow a flattened end of a rod to be inserted, lowered, and snapped in place. Inserting a rod into both groups creates a simple, economical, and reusable connection of the two rods. Four tabs protrude into the channel with a center line just above the top of the rod to be inserted allowing the rod to be held firmly in the connector and creating a barrier that restricts the rod from starting to moving to a position perpendicular to the connector which is how the rod is inserted and taken out. The length and width of the material for the connector can vary depending on the weight requirements, with a coated or inherently corrosion resistant alloy or a plastic that can resist the elements of the outdoors as appropriate.

17 Claims, 3 Drawing Sheets

OTHER PUBLICATIONS

HandyPost™, Form No. 494–10M; Universal Industrial Products Company, One Coreway Drive, Pioneer, OH 43554–0628.

Green Esteem, Catalog No. 3, 1999 Birdfeeding & Garden Accessories; Hiatt Manufacturing, Inc., 4410 Theurer Blvd., Winona, MN 55987.

* cited by examiner

HANGER APPARATUS

The present application is continuation-in-part of co-pending patent application Ser. No. 09/144,291 filed Aug. 31, 1998, which is incorporated herein by reference.

TECHNICAL FIELD

The present invention relates to hangers. More particularly, the present invention relates to hangers having connectors that join elongate rods together for suspending articles.

BACKGROUND OF THE INVENTION

For ornamental, environmental, and related purposes, there is a need to hang items such as bird houses, bird feeders, plants, flowers, outdoor lanterns, and other items, outside of homes and buildings. Elongate members having at least one end that is bent into an arcuate hook-shape define hangers for supporting such items. These hangers preferably are reusable and adjustable to allow for hanging different items at different heights at different times. The hangers are also preferably lightweight to make the process of hanging such items easy, yet the hangers must be strong enough to hold a significant weight. The hanger should be simple to install and to use without requiring the use of many additional tools. Because hangers are typically positioned with an article, and are not usually reinspected routinely, the hanger must not easily or unintentionally come apart.

Current devices to hang items generally use continuous rods or are assembled with threaded rods and circular connectors. The elongate continuous rods typically are mounted in the ground or a base and have a hook at a distal end for hanging an article. These devices however are of fixed lengths. Devices using assembled rods and connectors can be selectively made to length. The connectors are tapped to receive the threaded rod. Often, persons installing such devices need tools to tighten the connection between the rod and the connector. Unless a secondary item or liquid lock-tight material is used, the connection may become loose, and the hanging item may fall. The likelihood of the secondary locking device being used by installers is low, because such materials are not typically included with the hanger when purchased by consumers. Also, an animal swinging on the feeder, or the wind blowing, may cause sufficient torque to loosen these connections. Loosened connections may permit the hanger to eventually come apart. This causes the item that was hung to fall to the ground and can result in damage to the item.

Accordingly, there is a need in the art for improved hanger that is selectively assembled to length for suspending articles. It is to such that the present invention is directed.

SUMMARY OF THE PRESENT INVENTION

The present invention provides a hanger apparatus readily assembled to a selected length for suspending articles therefrom, comprising a first elongate member bent at a first end portion to define an enlarged hook for being received on an overhead support and an opposing distal end defining a flange and a second elongate member bent at a first end portion to define a hook for receiving an article to be suspended from the overhead support and an opposing distal end defining a flange. A connector joins the first elongate member and the second elongate member together coaxially, by engaging the connector to the respective flanges, whereby the elongate members are substantially aligned for suspending the article from the support. The connector comprises an open channel substantially U-shaped in cross-sectional view having a pair of opposing side walls and a web therebetween for receiving a portion of an elongate member therein. Each of the opposing side walls defines a pair of spaced-apart opposed L-shaped slots that separate the respective side wall into opposing distal end walls and define an intermediate wall therebetween having a T-shape. The first elongate member and the second elongate member are secured in the connector.

Objects and Advantages

Among the objects and advantages of the present invention are:

(a) to provide a connector between two rods that can easily be used requiring no additional tools for installation;

(b) to provide a reusable connector to make assembling and disassembling easy and quick;

(c) to provide a lightweight yet strong design;

(d) to provide a method of connection that does not rely on any secondary parts, liquids, or compounds;

(f) to provide a corrosion resistant alloy, plastic, or other material so connector may be used outdoors;

(g) to provide a connector that is simple and economical to manufacture.

Other objects, features, and advantages of the present invention will become apparent from a reading of the following specification, in conjunction with the drawings and the appended claims.

DETAILED DESCRIPTION OF THE PREFERRED EMBODIMENTS

Figure 1:
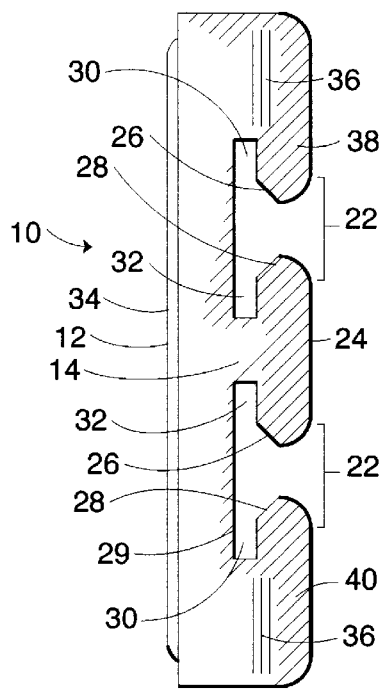
FIG. 1 is a side view of a connector for joining together two rods for suspending an article, according to the present inventions.
Figure 2:
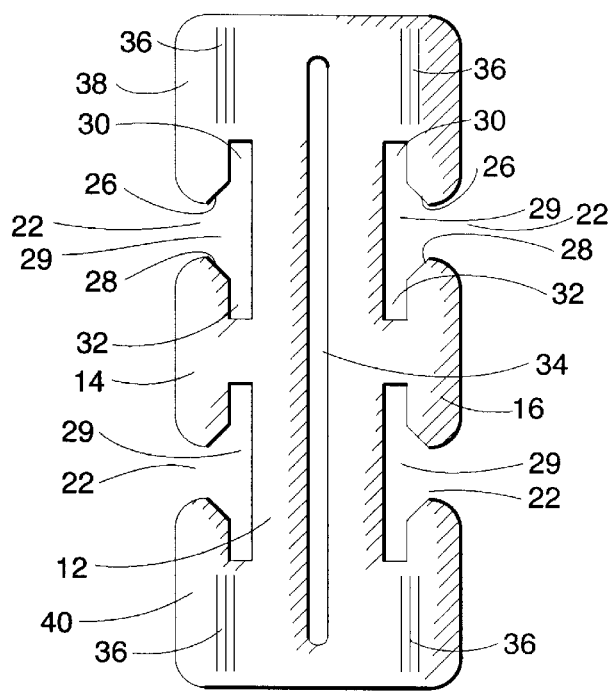
FIG. 2 is a top plan view of a blank for making the connector shown in FIG. 1, to illustrate the relationships of the elements of the connector according to the present invention.
Figure 3:
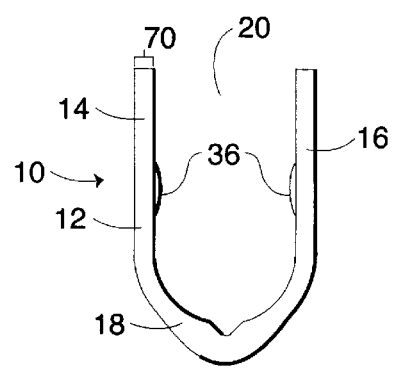
FIG. 3 is an end view of the connector illustrated in FIG. 1.

Referring now in more detail to the drawings, in which like numerals indicate like parts throughout the several views, FIG. 1 illustrates a side view of a connector 10 for joining together two rods for assembling a hanger for suspending an article, as discussed below. With reference to FIGS. 1–3, the connector 10 comprises an open channel 12 having a pair of opposing side walls 14, 16 with a web 18 therebetween, and which defines an open side 20. The open side 20 provides access to the channel 12 for a rod to be disposed longitudinally, as discussed below.

As illustrated in FIGS. 1 and 2, the opposing side walls 14, 16 each define a pair of spaced apart openings 22 that extend from a distal edge 24 of the side walls 14, 16 towards the web 18. Portions of the side walls 14, 16 define oblique angle edges 26, 28 of the openings 22. In the illustrated embodiment, the oblique angled edges 26, 28 are disposed at 45 degrees relative to a center line of the openings 22.

Each side wall 14, 16 further defines two elongated slots 29 which are disposed substantially parallel to a longitudinal access of the channel 12. Each slot 29 communicates or is open to a respective one of the openings 22. In the illustrated embodiment, each slot 29 has a distal end portion generally 30 and an interior portion generally 32, for a purpose discussed below. A rib 34 is defined on an exterior surface of the web 18. For example, the rib 34 may be a thickened portion of the web 18. In the illustrated embodiment, the rib 34 extends substantially the entire length of the channel along the longitudinal axis of the channel, for increasing the rigidity and strength of the channel. The rib 34 preferably extends three-quarters of the length.

Each opposing side wall 14, 16 defines a pair of spaced apart tabs 36 in opposing distal ends 38, 40 of the channel 12. The tabs 36 preferably are elongate and protrude from the side walls 14, 16 inwardly into the channel 12. The aligned opposing tabs 36 accordingly provide a narrowed portion in the channel as best illustrated in FIG. 3, which grip a rod received into the channel as discussed below.

Figure 5:
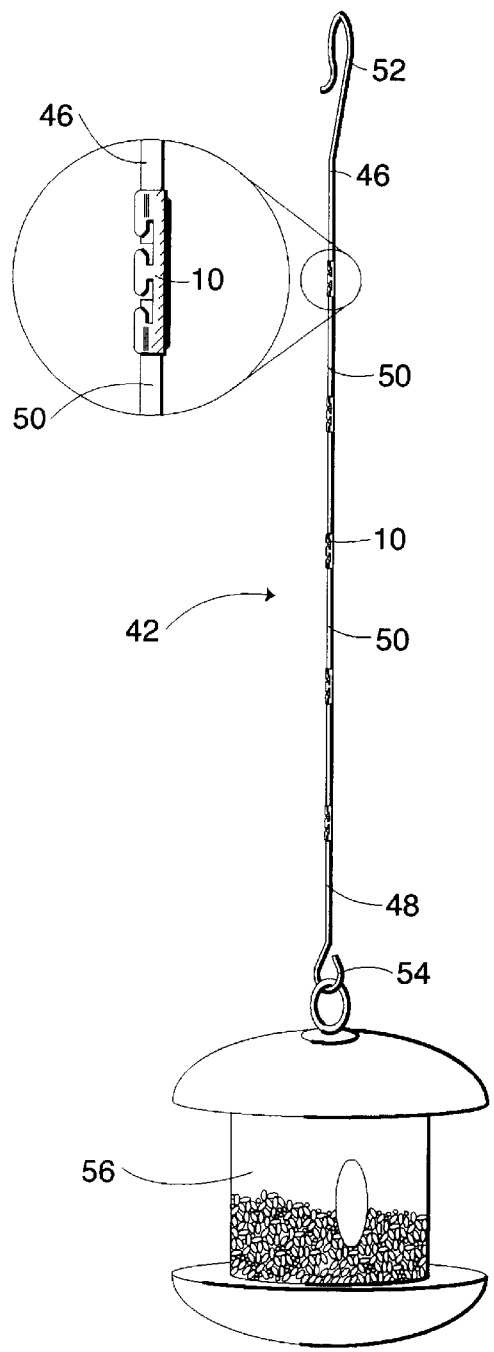
FIG. 5 illustrates a plurality of rods and connectors assembled together to make a hanger, with a detailed illustration of one such connection.

FIG. 5 illustrates a hanger 42 that comprises a plurality of the connectors 10 assembled together with elongate rods. The hanger 42 includes at least one primary rod 46 and a secondary rod 48 with intermediate rods 50 selectively interposed therebetween, depending on the length of the hanger 42. The primary rod 46 defines an enlarged hook 52 at a distal end for engaging a support, such as a tree branch as illustrated in FIG. 5. The secondary rod 48 defines a smaller hook 54 at a distal end for engaging a article to be suspended by the hanger 42, such as a bird feeder 56 as illustrated in FIG. 5. The rods 46, 48 terminate at opposing distal ends with a flat flange 58 for being received in the openings 22 and the slots 28, as discussed below. The intermediate rods 50 include flanges 58 at both opposing distal ends. In a preferred embodiment, the rods 46, 48, and 50 are made of metal wire which is cut to a selected length. As illustrated, the primary rod 46 has a larger hook 52 than the hook 54 in the secondary rod 48. The flanges 58 in the ends of the rods 46, 48, and 50 are formed in a press. The end of the rod is inserted into a press which is struck to define the flat flange 58. In a preferred embodiment, the flange is centered along the longitudinal axis of the rod.

Figure 6:
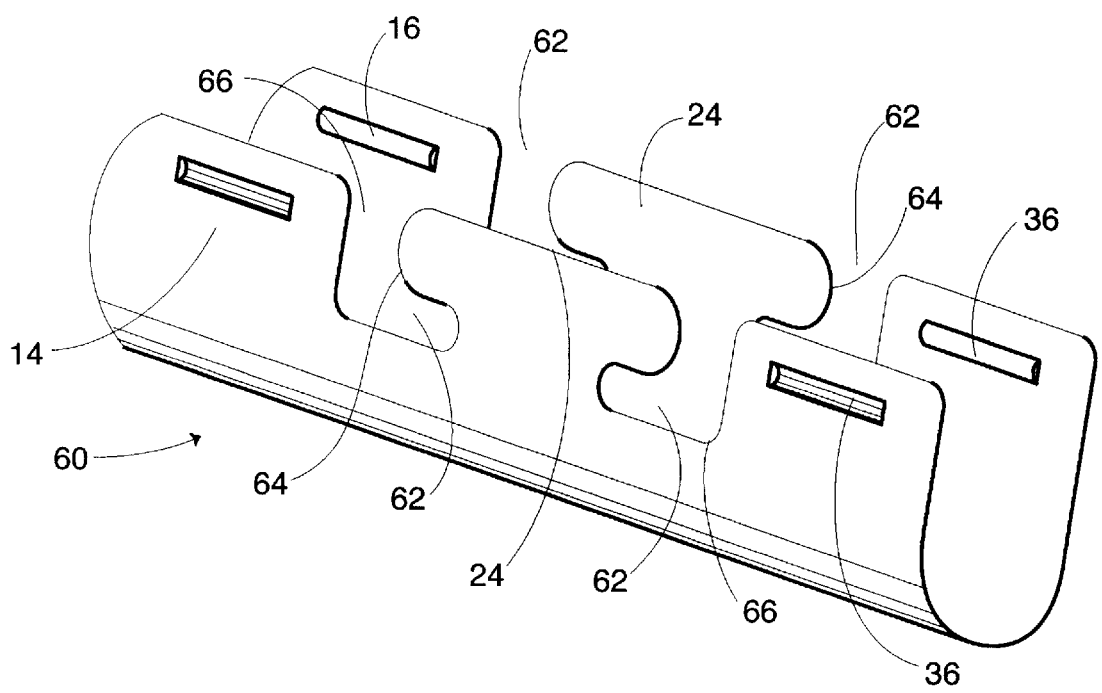
FIG. 6 is a prospective view of an alternate embodiment of the connector illustrated in FIG. 1.

FIG. 6 is a prospective view of an alternate embodiment 60 of the connector 10 according to the present invention. In the alternate embodiment, the opposing side walls 14, 16 each define two spaced-apart L-shaped slots 62 which are open to the distal edge 24 of the side walls. The slots 62 are defined so that the distal extent of the slot faces the distal extent of the opposing slot. Preferably, a guide surface 64 adjacent the opening of the slot 62 is radiused. An interior angle 66 defines the change of direction of the slot 62 to the extent. The interior angle 66 is likewise radiused. The opposing walls 14, 16 define the opposing pairs of protruding tabs 36.

The connector 10 on the present invention is preferably manufactured with a corrosion-resistant alloy, a plastic, or other material satisfactory for outdoor use. With reference to FIG. 2, the channel 12 is formed as a blank that is stamped or die-cut from a sheet of steel. The die cuts the openings 22 and the slots 28. The die also pushes the tabs 36 so that they protrude from the sheet. The blank is then folded to define the open channel 12, as illustrated in FIG. 3, whereby the tabs 36 define opposing protrudences into the channel 12.

Figure 4A:
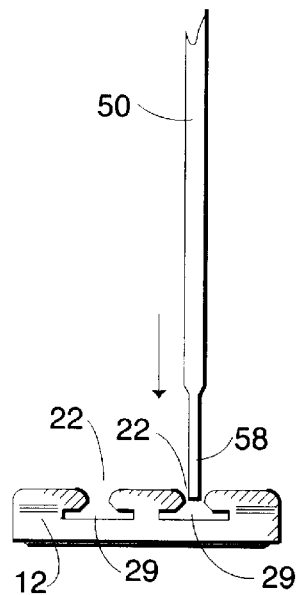
FIGS. 4a and 4b illustrate a rod with a flattened end being inserted into the connector and pivoted to drop into a hanging position within the connector.
Figure 4B:
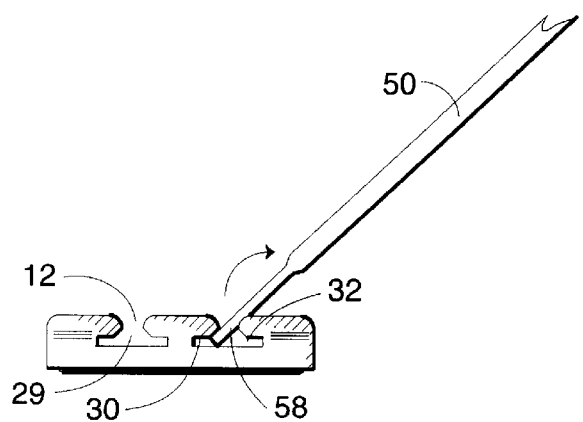

The connectors 10 are used to join the rods 46, 48, and 50 to assemble the extended length hanger 42 of a selected length for use in supporting articles such as the bird feeder illustrated in FIG. 5. The primary rod 46, the secondary rod 48, and the intermediate rods 50 each have the flattened flanges 58. The following describes joining an intermediate rod 50 to the connector 10, but such also applies to the connection of the primary rod 46 and the secondary rod 48 to the connector 10. With reference to FIGS. 4a and 4b, the flattened flange 58 is inserted into one of the pairs of opposed openings 22 in the side walls 14, 16. The oblique-angled edges 26 facilitate clearance and insertion of the flange 58 into the openings 22 and subsequently into the slots 28. The rod 50 is then pivoted towards the distal end of the channel 12. The flange 58 enters the slots 28 on the opposing sides 14, 16. The rod 50 bears against the tabs 36. Pressure is applied to the rod 50 to force the rod past the opposed tabs 36 and into alignment with the web 18 of the channel 12. The tabs 36 bear against the rod 58 and secure the rod in the channel 12, which also guard against unintentional disengagement.

An alternate embodiment (not illustrated) does not provide the protruding tabs 36. In this embodiment, the flanges 58 slide longitudinally into the respective distal portions 30 of the slots 28. This secures the flanges 58 in the connector 10.

The alternate embodiment of the channel 12 illustrated in FIG. 6 however does not include the distal portions 30 of the slots 28. In this embodiment, the tabs 36 bear firmly against the rod 50 to secure the rod in the channel 12.

With reference to FIG. 5, the primary rod 46 and the secondary rod 48 are connected together with one of the connectors 10 in order to hang an article, such as the bird feeder 56 from a support, such as the illustrated tree. In this embodiment, additional intermediate rods 50 are disposed between the primary and secondary rods 46, 48 by similarly inserting and securing distal ends of the rods in respective connectors 10. As illustrated in detail view in FIG. 5, the connector 10 substantially coaxially aligns the rods used to assemble the hanger 42 according to the present invention.

The bird feeder 56, or other article, is attached to the hook 54 for suspending the article.

Summary

With reference to FIGS. 1–3, in accordance with the present invention, a connector 10 in a substantially cylindrical shape comprises an open channel 12 which defines an open side 26 running down the entire length, with four openings 22 that have 45 degree angles 26 that open into four slots 29, with a rib 34 running down approximately seventy five percent of the length opposite of the open side of the channel for strength with four protruding tabs 36 in the channel that help secure a rod 46, 48, or 50 therein.

Description

A typical embodiment of the connector 10 of the present invention is illustrated in FIGS. 1–3.

The use of the connector 10 by inserting the rods 46, 48, or 50 with the flattened end or flange 58 is shown in FIG. 4.

Combining a plurality of connectors 10 and rods 46, 48, and 50 shows the entire hanging assembly or hanger 42 as illustrated in FIG. 5.

A rod 46, 48, or 50 with a flattened end or flange 58 is held perpendicular to the connector 10 and inserted in the opposing openings 22 (FIG. 4), then dropped and snapped into place. The oblique angle edges 26, 28, preferably the 45 degree opening 22 (FIG. 1) allows the flattened end or flange 58 of the rod clearance as it swings into the slot. This allows the openings 22 to be as small as possible after taking into consideration production tolerances on both the flattened rod and producing the opening. The smaller the opening the better on eliminating the chances of the rod coming out unintentionally.

There are four slots 29 (FIG. 2) which allow the ends 58 of the flattened rod to travel the entire distance but still be encapsulated and not let the rod start to move to a perpendicular position that could eventually allow the rod to come out. In one embodiment, the slots 29 allow the rod to travel while the assembly is being pushed or hoisted into the air to be hung over a branch or placed in an eyelet. After the item has been hung the flange of the lower rod will rest at the bottom 32 of the slot 29 and be held by the force of gravity on the rod and item that is being hung. In a preferred embodiment, to help ensure the rod will resist starting to move in a motion to be perpendicular to the connector 10, four protruding tabs 36 (FIGS. 2 and 3) are placed inside of the channel 10 (FIG. 3) to help hold the rod. These protrusions center lines are preferably located approximately three-quarters up the top of the rod, as shown in FIG. 3 to hold the rod firmly inside the channel 10. The protrusion are of such a length to keep the rod from rotating on one point. The depth of the protrusion is sufficient to help hold the rod firmly in place but not enough to prohibit the rod from being inserted. A rib 3 runs down approximately seventy-five percent of the length of the opposite side of the connector from the open side 20. This rib contributes to the strength of the connector which allows the thickness of the material to be kept it a minimum. The connector is of uniform thickness 70 (FIG. 3)which is determined by the amount of the weight expected on the assembly.

Summary

Accordingly the reader will see that the connector 10 is a simple and economical device to join two rods. In addition, the connector is easy to use requiring no additional tools or locking devices to hold the rods 46, 48, 50 in place. In one embodiment, the hanger 42 provides a satisfactory method of holding the rods in place using gravity by moving the flanges 58 into the distal portions 32 of the opposing slots 29. In a preferred embodiment, four tabs 36 protrude into the channel 10 to hold the rod (46, 48, 50) firmly in the connector and keep the rod from starting any movement to be perpendicular to the connector and could allow the rod to come out of the slots. The connector permits assembly and disassembly quickly and easily, allowing for this connector to be reused. The design is simple but strong and in one embodiment rigid because of the rib which runs down at least seventy-five percent of the side opposite of the channel opening.

Although the description above contains many specificity's, these should not be construed as limiting the scope of the invention but merely providing an illustration. For example, the material can be coated or an inherently corrosion resistant steel alloy, aluminum, plastic, or other composite material that can withstand the outdoor elements. The length and width of the connector can vary depending on the weight requirements.

The specification has thus described in various embodiments the connector and hanger of the present invention including the manufacture and use thereof. It is to be understood, however, that numerous changes and variations may be made in the construction of the present invention. It should therefore be understood that modifications to the present invention may be made without departing from the scope thereof as set forth in the appended claims.

What is claimed is:

1. An apparatus used to connect two rods that each have at least one flattened end, comprising:

a pair of rods, each having a first flattened end and defining a supporter at opposing second ends;

a channel having opposing side walls and a web therebetween defining an opening along the length of the channel to allow a portion of each of the pair of rods to be disposed longitudinally therein;

opposing side walls of the channel defining two aligned pairs of openings through which the flattened end of one of the rod passes while the rod is being inserted, lowered, and snapped into place in the channel; and the opposing side walls each defining two coaxially-aligned, spaced-apart slots which are open to the openings for the flattened end of the rod to travel in, depending if the rods are being hoisted up or the rod is seated while being held by weight and gravity, whereby the apparatus, being attached to a support by one of the supporters and to an article to be suspended by the second of the supporters, suspends the article from the support.

2. The apparatus as recited in claim 1, further comprising four tabs protruding from opposing side walls inside of the channel at such depth to hold the rods firmly but not at such a depth to restrict the rod from being seated in the connector.

3. The apparatus as recited in claim 2, wherein the center line of the tabs being located approximately three-quarters of the thickness of the rod.

4. The apparatus as recited in claim 2, further comprising a rib extending parallel to a longitudinal axis of the channel on an exterior surface of the channel opposite the opening for strength and rigidity.

5. The apparatus as recited in claim 4, wherein the rib extends approximately seventy five percent of the length of the channel.

6. A hanger apparatus for suspending articles from overhead supports, comprising:

a first elongate member bent at a first end portion to define an enlarged hook for being received on an overhead support and an opposing distal end defining a flange;

a second elongate member bent at a first end portion to define a hook for receiving an article to be suspended from the overhead support and an opposing distal end defining a flange;

a connector joining the first elongate member and the second elongate member together coaxially, by engaging the connector to the respective flanges, whereby the elongate members are substantially aligned for suspending the article from the overhead support, the connector comprising:

an open channel substantially U-shaped in cross-sectional view having a pair of opposing side walls and a web therebetween for receiving a portion of an elongate member therein;

each of the opposing side walls defines a pair of spaced-apart opposed L-shaped slots that separate the respective side wall into opposing distal end walls and define an intermediate wall therebetween having a T-shape; and means for securing the first elongate member and the second elongate member in the connector.

7. The hanger as recited in claim 6, wherein means for securing comprises a second slot open to the L-shaped slot and extending longitudinally in the side wall coextensive with one leg of the L-shaped slot, whereby portions of the flange are slidingly disposed in the opposing second legs for securing the respective first elongate member or second elongate member in the connector.

8. The hanger as recited in claim 6, wherein means for securing comprises a pair of opposing protruding lands that extend into the channel, one land defined in each of the opposing distal end walls, whereby the respective first elongate member or second elongate member is forcibly held in the channel by the lands.

9. The hanger as recited in claim 6, further comprising a rib defined on an outward surface of the web of the channel.

10. The hanger as recited in claim 9, wherein the rib extends substantially the length of the web.

11. The hanger as recited in claim 9, wherein the rib extends approximately seventy five percent of the length of the web.

12. The hanger as recited in claim 6, further comprising four slots which line up in two groups of tracks which receives the flange of the respective first elongate member or the second elongate members that travels therein.

13. The hanger as recited in claim 6, wherein means for securing comprises four tabs protruding inwardly of the channel as such depth to hold a portion of the first and second elongate members firmly but not at such a depth to disallow the first and second elongate members to be seated in the connector, the center line of the tabs are located approximately three quarters up the thickness of the first and second members as each is seated in the connector.

14. The hanger as recited in claim 6, wherein the slots define a T-shaped portion having two opposing pairs of spaced-apart openings with a 45 degree angle on one side for clearance of the flange into one of the pairs of opposing openings while the respective first elongate member or second elongate member is being inserted, lowered, and snapped into place in the channel.

15. The hanger as recited in claim 6, further comprising an elongate rod having flanges at opposing distal ends for being received into separate connectors, whereby the length of the hanger is increased by using one or more of said elongate rods as intermediate members between the first elongate member and the second elongate member.

16. The apparatus as recited in claim 1, wherein the article comprises a bird product.

17. The apparatus as recited in claim 1, wherein the article comprises a bird feeder.

* * * * *